Nov. 22, 1927. Re. 16,789

C. F. JENKINS

PRISM LENS DISK

Original Filed Sept. 11, 1922

Inventor

CHARLES FRANCIS JENKINS

By Paul Carpenter

Attorney

Reissued Nov. 22, 1927. Re. 16,789

UNITED STATES PATENT OFFICE.

CHARLES FRANCIS JENKINS, OF WASHINGTON, DISTRICT OF COLUMBIA, ASSIGNOR TO JENKINS LABORATORIES, A CORPORATION OF THE DISTRICT OF COLUMBIA.

PRISM-LENS DISK.

Original No. 1,521,191, dated December 30, 1924, Serial No. 587,522, filed September 11, 1922. Application for reissue filed December 29, 1926. Serial No. 157,824.

This invention relates to apparatus for the transmission of picture-by-radio, in which apparatus the picture is made up of lines of light crossing a picture surface, said lines of light having greater or less density in different parts of the line. The principal object of the invention is to permit a much higher speed than is possible with apparatus heretofore proposed for the purpose.

Figure 1:
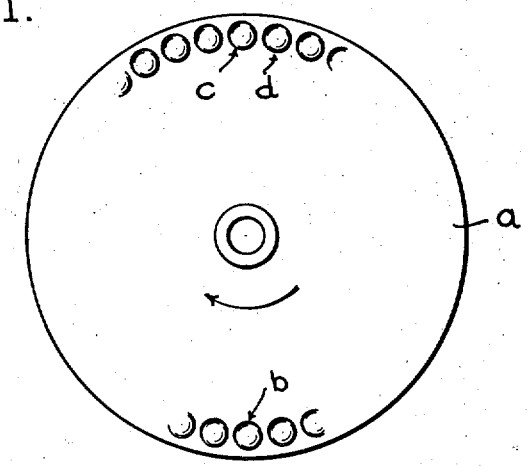
Figure 1:
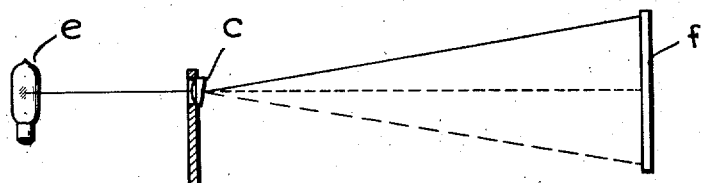
Figure 2:
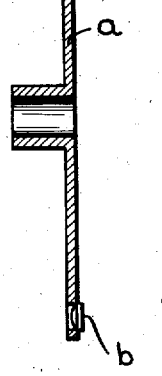
Figure 3:
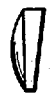
Figure 4:
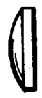
Figure 5:
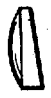
Figure 6:
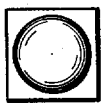
Figure 7:
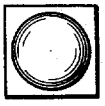
Figure 8:
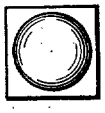

In the drawings, Figure 1 is a lens-prism carrier; Figure 2 a sectional view of the same; Figures 3, 4, 5, 6, 7 and 8 edge and face views of the individual lens-prisms. In the drawings like symbols refer to like parts, *a* being the disk-lens prism carrier; *b* the lens-prism element shown in Figures 4 and 7; *c* the lens-prism shown in Figures 3 and 6; *d* the lens-prism shown in Figures 5 and 8; each lens-prism element may be made up of a plain-faced prism upon one face of each of which a lens is mounted, or it may be made in a single piece; *e* is a source of light; and *f* a light receiving surface.

The object sought is to cause the point of the pencil of light from *e* passing through *c* and crossing the light-receiving surface *f* from one of its sides to the other, and in succession from top to bottom once for each revolution of the disk *a*. This object is accomplished in the device shown by reason of the fact that each prism crossing the pencil of light from the lamp *e* has in succession a less and less angle between its faces than has prism *c*, which latter has its base outward and which may be considered as beginning the series of lines. The lens prisms are arranged in an annular series at the periphery of the rotating disk and when the disk *a* has made a half revolution, the prism *b* is brought into the line of the pencil of light, and as this "prism" has parallel sides the light is not deflected at all but passes straight through and falls upon the middle of the light-receiving surface, shown by the dotted line.

As the disk continues to rotate the prism angle increases in each succeeding prism with its base inward until prism *d* is reached, which prism has the same angle as prism *c*, but with its base in the reverse direction. This last prism causes the line of light to fall upon the picture surface along the dashed line.

It will be apparent to one skilled in the art, that the operation of my invention is reversible, that is, the apparatus shown may be used as a scanner for analyzing a picture situated at *f* and translating the successive light variations into like electrical current variations by substituting for lamp *e* a light sensitive cell.

What I claim is:

1. In apparatus of the class described, a rotating carrier having peripherally mounted thereon a plurality of prism-faced lenses, each prism of the prism lens element in succession upon the carrier having a different angle from the adjacent prism of the prism-lens element.

2. In apparatus of the class described, a rotating carrier having peripherally arranged thereon a plurality of like lenses, and in the optical axis of each of which is a prism, each prism having successively a different angular value from the adjacent prisms, the prism mounted to rotate with the lens.

3. In apparatus of the class described, a rotating peripherally apertured disk, means supporting lenses in line with each aperture, and a separate prism being located in the optical axis of each lens the prisms having different angles.

4. In apparatus of the class described, a peripherally apertured disk, means supporting a lens, a prism in line with each aperture, a light source, and a light receiving surface, both so located that light from the source will fall on the receiving surface after passing through the lenses and prisms in succession.

5. The combination of a stationary picture surface, a stationary source of light, a rotatable light distributing member having mounted thereon a plurality of lenses for causing a succession of beams of light to traverse said surface over the same path, and means for causing successive beams to traverse said surface by different paths.

6. The combination of a stationary picture surface, a stationary source of light, a rotatable light distributing disk located between said surface and light, said disk being provided at its periphery with a plurality of apertures arranged in an annular series to cause a succession of beams of light to traverse said surface, and means associated with each aperture to cause the beams to traverse the surface by different paths.

7. In combination, a stationary picture surface, a stationary light translating device, means including a plurality of lenses for forming images of one of the said parts on the other, means for moving said image forming device to cause the images to successively traverse the image plane and a plurality of prisms movable with the lenses and having their faces at different angles for causing successive images to traverse said image plane by different paths.

8. In apparatus of the class described, a movable carrier having mounted thereon a plurality of prism faced lenses, each prism of the prism lens element in succession upon the carrier having a different angle from the adjacent prism of the prism lens element.

In testimony whereof I affix my signature.

CHARLES FRANCIS JENKINS.